(12) United States Patent
Pollett

(10) Patent No.: US 9,695,542 B2
(45) Date of Patent: Jul. 4, 2017

(54) UNITARY SPRAY NOZZLE FOR A WASHING MACHINE APPLIANCE

(71) Applicant: General Electric Company, Schenectady, NY (US)

(72) Inventor: James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 224 days.

(21) Appl. No.: 14/533,150

(22) Filed: Nov. 5, 2014

(65) Prior Publication Data

US 2016/0122934 A1 May 5, 2016

(51) Int. Cl.

| | |
|---|---|
| *B05B 1/04* | (2006.01) |
| *D06F 39/08* | (2006.01) |
| *B22F 3/105* | (2006.01) |
| *B33Y 10/00* | (2015.01) |
| *B33Y 80/00* | (2015.01) |
| *B22F 5/10* | (2006.01) |
| *B05B 1/22* | (2006.01) |
| *B05B 1/02* | (2006.01) |
| *B29C 67/00* | (2017.01) |

(52) U.S. Cl.
CPC ......... *D06F 39/088* (2013.01); *B22F 3/1055* (2013.01); *B22F 5/10* (2013.01); *B33Y 10/00* (2014.12); *B33Y 80/00* (2014.12); *B05B 1/02* (2013.01); *B05B 1/04* (2013.01); *B05B 1/042* (2013.01); *B05B 1/22* (2013.01); *B29C 67/0051* (2013.01)

(58) Field of Classification Search
CPC .......... B05B 1/044; B05B 1/22; B05B 1/042; B05B 1/04; B05B 1/02; D06F 39/088; B33Y 10/00; B33Y 80/00; B22F 3/1055; B22F 5/10; B29C 67/0051
USPC .......... 239/589, 599, 601, 598, 597
See application file for complete search history.

(56) References Cited

U.S. PATENT DOCUMENTS

| | | | | |
|---|---|---|---|---|
| 3,045,931 A | * | 7/1962 | Hall .......... | A62C 2/08 239/275 |
| 3,292,861 A | * | 12/1966 | Kawamura ............ | A63J 17/00 239/17 |
| 3,831,859 A | * | 8/1974 | Allard ................ | A01G 13/0287 239/592 |
| 4,022,385 A | * | 5/1977 | Krueger .................. | B05B 1/044 239/592 |
| 4,688,720 A | * | 8/1987 | MacDonald ............ | B05B 17/08 239/17 |
| 5,004,156 A | * | 4/1991 | Montanier ................ | B05B 3/06 15/340.1 |

(Continued)

FOREIGN PATENT DOCUMENTS

CN 103287191 A 9/2013

*Primary Examiner* — Arthur O Hall
*Assistant Examiner* — Juan C Barrera
(74) *Attorney, Agent, or Firm* — Dority & Manning, P.A.

(57) ABSTRACT

A unitary nozzle for a washing machine appliance includes an inlet body and an outlet body that are integrally formed together. The outlet body defines an outlet conduit with a first cross-sectional area at an entrance of outlet conduit and a second cross-sectional area at an exit of the outlet conduit. A shape of the second cross-sectional area is substantially arcuate. A related method for forming a unitary nozzle of a washing machine appliance is also provided.

20 Claims, 5 Drawing Sheets

(56) References Cited

U.S. PATENT DOCUMENTS

| | | | |
|---|---|---|---|
| 6,304,720 B1 * | 10/2001 | Richard | ............... B29C 61/00 239/601 |
| 7,312,269 B2 | 12/2007 | Cevolini | |
| 8,286,236 B2 | 10/2012 | Jung | |
| 8,336,313 B2 | 12/2012 | McMasters | |
| 8,534,511 B2 * | 9/2013 | Carvalho | ............... B65D 35/38 222/566 |
| 2014/0312145 A1 * | 10/2014 | Fuller | ............... B05B 1/14 239/455 |

* cited by examiner

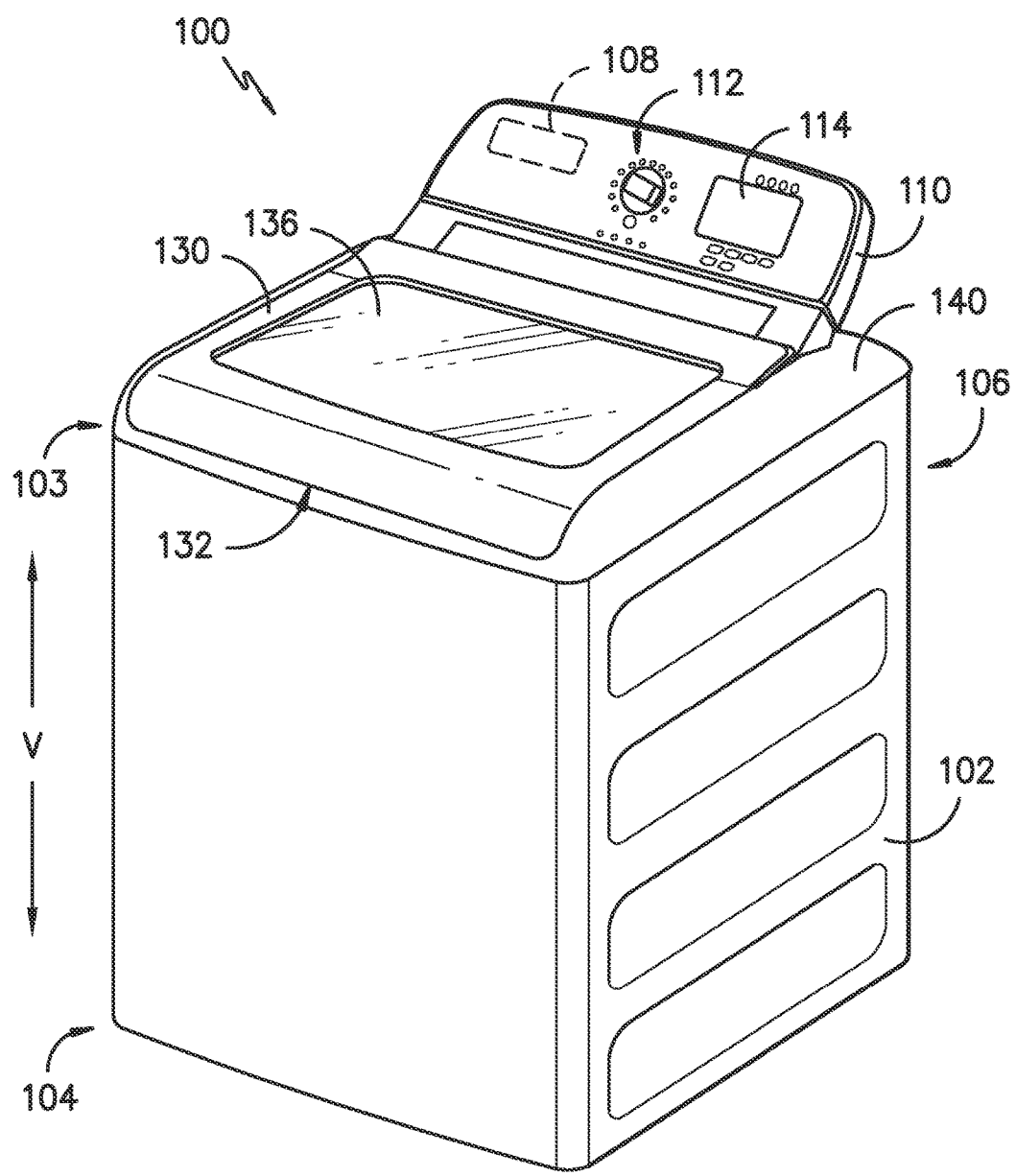
FIG. -1-

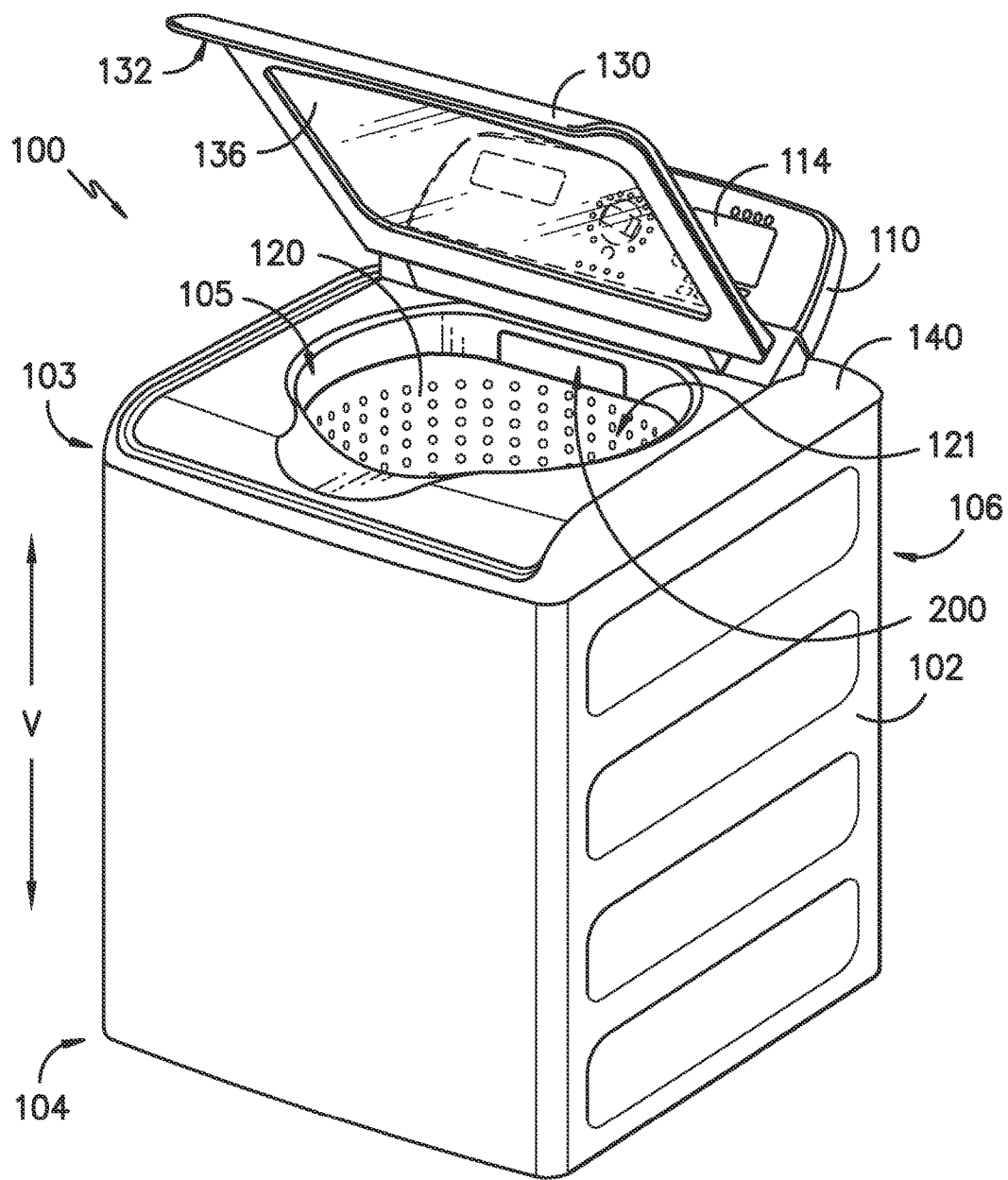
FIG. -2-

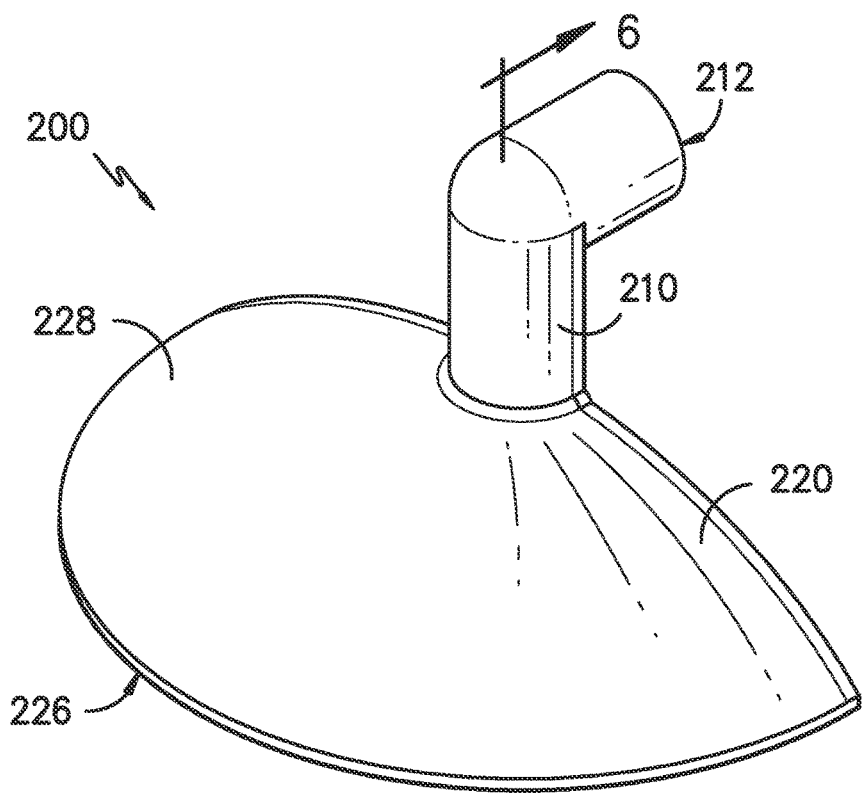
FIG. -3-
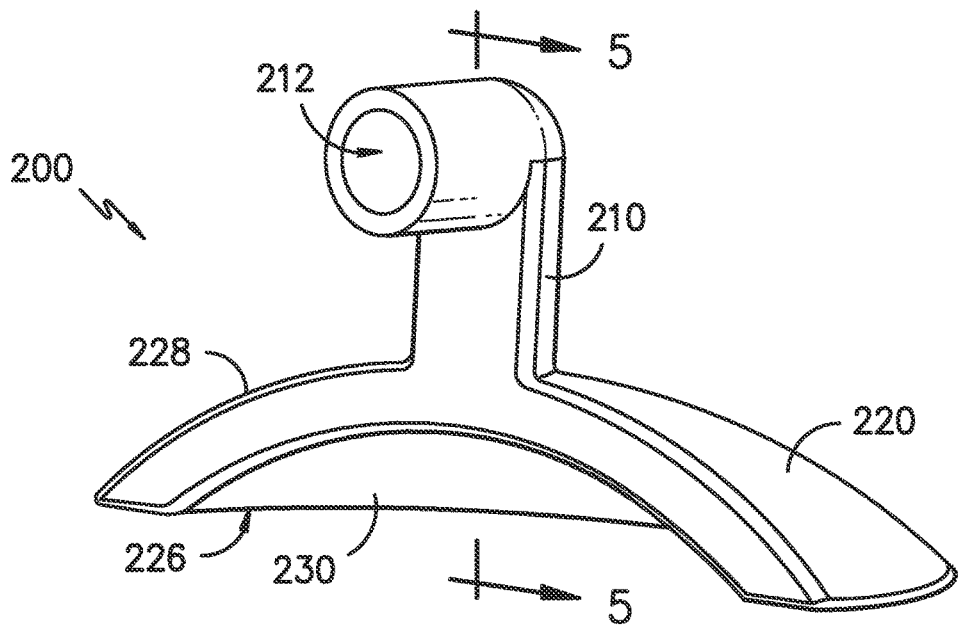
FIG. -4-

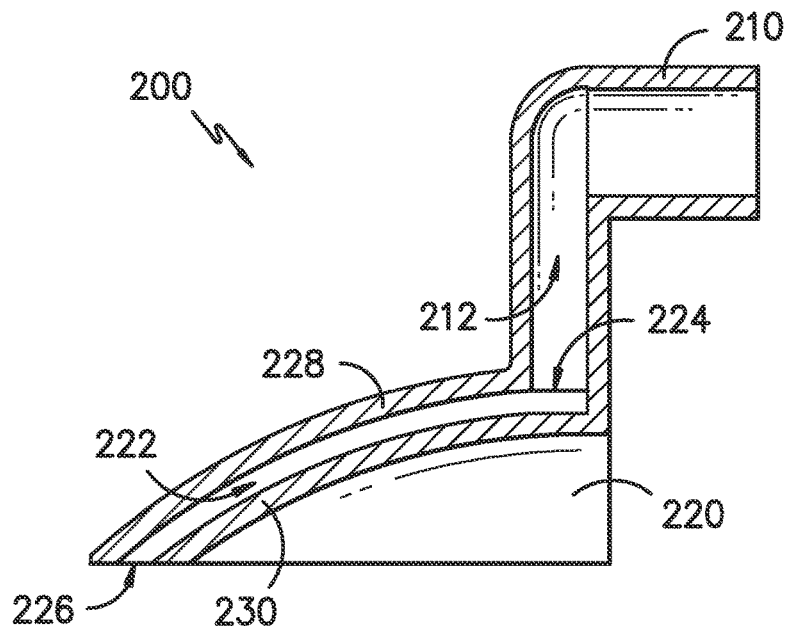
FIG. -5-
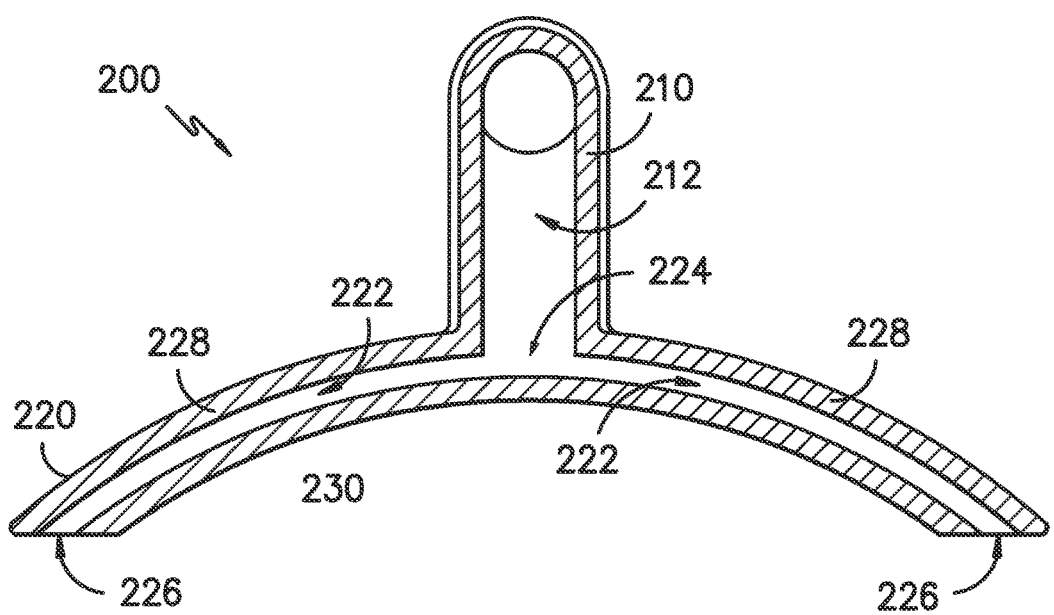
FIG. -6-

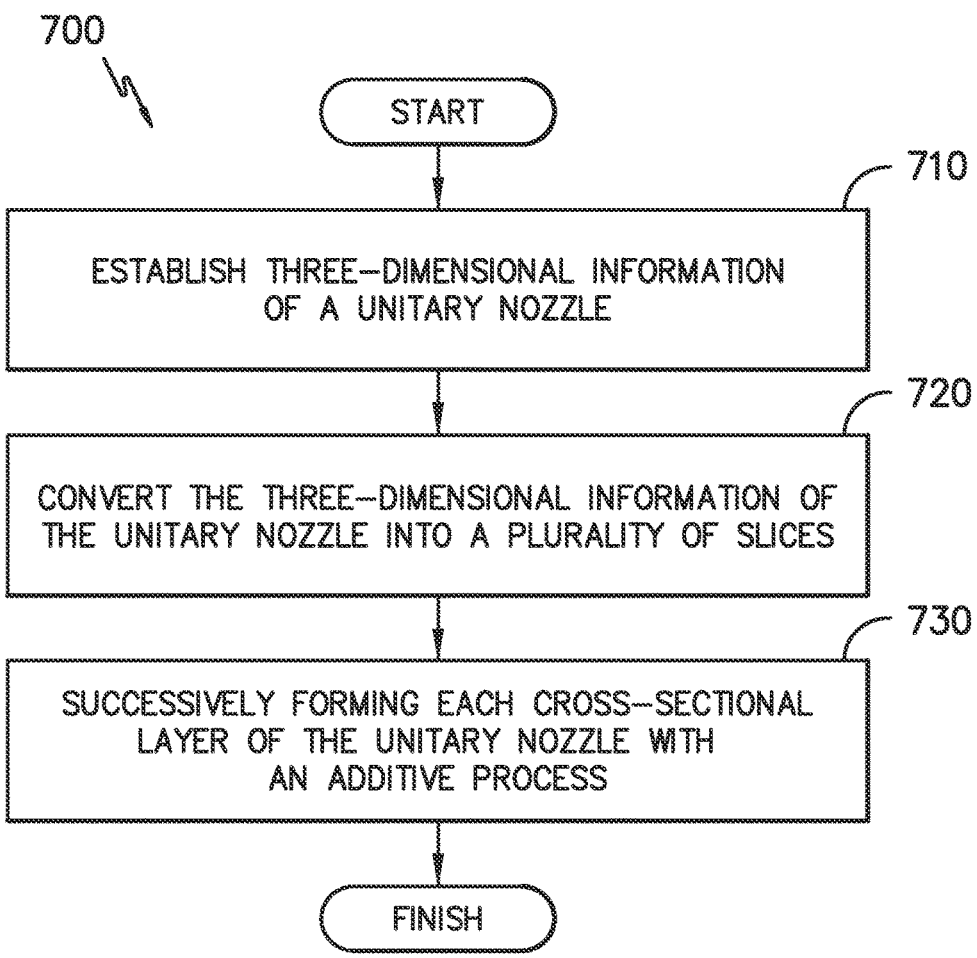
FIG. -7-

UNITARY SPRAY NOZZLE FOR A WASHING MACHINE APPLIANCE

FIELD OF THE INVENTION

The present subject matter relates generally to washing machine appliances and spray nozzles for the same.

BACKGROUND OF THE INVENTION

Washing machine appliances generally include a tub and a basket positioned with the tub. Articles for washing are placed within the basket, and the basket is rotated within the tub in order to clean the articles within the basket. The articles are also generally soaked with wash fluid during a wash cycle in order to assist cleaning the articles. After the wash cycle is complete, the articles may be rinsed in order to remove the wash fluid from the articles.

Thoroughly rinsing the articles can be difficult. For example, nozzles that direct wash fluid into the basket can be difficult to accurately aim such that fluid from the nozzle is directed towards all articles within the basket, and the rinse cycle may take an extended period of time or consume a large amount to water in order to thoroughly rinse the articles. In addition, articles within the basket may stick to sidewalls of the basket after the basket is rotated at high speeds to wring wash fluid from the articles. Removing the articles from the sidewalls of the basket with fluid from the nozzle can be a tedious and long process.

Accordingly, a washing machine appliance with features assisting with thoroughly rinsing articles within a basket of the washing machine appliance would be useful. In addition, a washing machine appliance with features for assisting with removing articles from a sidewall of a basket of the washing machine appliance would be useful.

BRIEF DESCRIPTION OF THE INVENTION

The present subject matter provides a unitary nozzle for a washing machine appliance. The unitary nozzle includes an inlet body and an outlet body that are integrally formed together. The outlet body defines an outlet conduit with a first cross-sectional area at an entrance of outlet conduit and a second cross-sectional area at an exit of the outlet conduit. A shape of the second cross-sectional area is substantially arcuate. A related method for forming a unitary nozzle of a washing machine appliance is also provided. Additional aspects and advantages of the invention will be set forth in part in the following description, or may be apparent from the description, or may be learned through practice of the invention.

In a first exemplary embodiment, a unitary spray nozzle for a washing machine appliance is provided. The unitary spray nozzle includes an inlet body that defines an inlet conduit. The inlet conduit is configured for receiving a flow of wash fluid and directing the flow of wash fluid through the inlet body. An outlet body is integrally formed with the inlet body and defines an outlet conduit. The outlet conduit is contiguous with the inlet conduit of the inlet body such that the outlet conduit is configured for receiving the flow of wash fluid from the inlet conduit and directing the flow of wash fluid through the outlet body. The outlet conduit has a first cross-sectional area at an entrance of outlet conduit and a second cross-sectional area at an exit of the outlet conduit. A shape of the second cross-sectional area is substantially arcuate. The shape of the second cross-sectional area is different than a shape of first cross-sectional area.

In a second exemplary embodiment, a method for forming a unitary spray nozzle for a washing machine appliance is provided. The method includes establishing three-dimensional information of the unitary spray nozzle, converting the three-dimensional information of the unitary spray nozzle from the step of establishing into a plurality of slices with each slice of the plurality of slices defining a respective cross-sectional layer of the unitary spray nozzle, and successively forming each cross-sectional layer of the unitary spray nozzle with an additive process. After the step of successively forming, the unitary spray nozzle has an inlet body that defines an inlet conduit and an outlet body that defines an outlet conduit. The outlet conduit is contiguous with the inlet conduit. The outlet conduit also has a first cross-sectional area at an entrance of outlet conduit and a second cross-sectional area at an exit of the outlet conduit. A shape of the second cross-sectional area is different than a shape of first cross-sectional area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance according to an exemplary embodiment of the present subject matter with a door of the exemplary washing machine appliance shown in a closed position.

FIG. 2 provides a perspective view of the exemplary washing machine appliance of FIG. 1 with the door of the exemplary washing machine appliance shown in an open position.

FIG. 3 provides a front, perspective view of a unitary nozzle according to an exemplary embodiment of the present subject matter.

FIG. 4 provides a rear, perspective view of the exemplary unitary nozzle of FIG. 3.

FIG. 5 provides a section view of the exemplary unitary nozzle of FIG. 4 taken along the 5-5 line of FIG. 4.

FIG. 6 provides a section view of the exemplary unitary nozzle of FIG. 3 taken along the 6-6 line of FIG. 3.

FIG. 7 illustrates a method for forming a unitary nozzle according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 illustrate an exemplary embodiment of a vertical axis washing machine appliance 100. In FIG. 1, a lid or door 130 is shown in a closed position. In FIG. 2, door 130 is shown in an open position. While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machines.

Washing machine appliance 100 has a cabinet 102 that extends between a top portion 103 and a bottom portion 104 along a vertical direction V. A wash basket 120 (FIG. 2) is rotatably mounted within cabinet 102. A motor (not shown) is in mechanical communication with wash basket 120 to selectively rotate wash basket 120 (e.g., during an agitation or a rinse cycle of washing machine appliance 100). Wash basket 120 is received within a wash tub or wash chamber 121 (FIG. 2) and is configured for receipt of articles for washing. The wash tub 121 holds wash and rinse fluids for agitation in wash basket 120 within wash tub 121. An agitator or impeller (not shown) extends into wash basket 120 and is also in mechanical communication with the motor. The impeller assists agitation of articles disposed within wash basket 120 during operation of washing machine appliance 100.

Cabinet 102 of washing machine appliance 100 has a top panel 140. Top panel 140 defines an opening 105 (FIG. 2) that permits user access to wash basket 120 of wash tub 121. Door 130, rotatably mounted to top panel 140, permits selective access to opening 105; in particular, door 130 selectively rotates between the closed position shown in FIG. 1 and the open position shown in FIG. 2. In the closed position, door 130 inhibits access to wash basket 120. Conversely, in the open position, a user can access wash basket 120. A window 136 in door 130 permits viewing of wash basket 120 when door 130 is in the closed position, e.g., during operation of washing machine appliance 100. Door 130 also includes a handle 132 that, e.g., a user may pull and/or lift when opening and closing door 130. Further, although door 130 is illustrated as mounted to top panel 140, alternatively, door 130 may be mounted to cabinet 102 or any outer suitable support.

A control panel 110 with at least one input selector 112 (FIG. 1) extends from top panel 140. Control panel 110 and input selector 112 collectively form a user interface input for operator selection of machine cycles and features. A display 114 of control panel 110 indicates selected features, operation mode, a countdown timer, and/or other items of interest to appliance users regarding operation.

Operation of washing machine appliance 100 is controlled by a controller or processing device 108 (FIG. 1) that is operatively coupled to control panel 110 for user manipulation to select washing machine cycles and features. In response to user manipulation of control panel 110, controller 108 operates the various components of washing machine appliance 100 to execute selected machine cycles and features.

Controller 108 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 110 and other components of washing machine appliance 100 may be in communication with controller 108 via one or more signal lines or shared communication busses.

Top panel 140 includes a unitary spray nozzle 200 (FIG. 2) for directing wash fluid, such as water and/or a mixture of water and at least one fluid additive, e.g., detergent, fabric softener, and/or bleach. While only one nozzle 200 is included in washing machine appliance 100, it will be understood that multiple nozzles may be used in alternative exemplary embodiments. Nozzle 200 is positioned near wash tub 121; in FIG. 2, nozzle 200 is depicted at a vertical position above wash tub 121 near back panel 106 of cabinet 102, but nozzle 200 could be positioned in other locations as well. Nozzle 200 is discussed in greater detail below.

In an illustrative example, laundry items are loaded into wash basket 120 through opening 105, and washing operation is initiated through operator manipulation of input selectors 112. Wash basket 120 is filled with water and detergent and/or other fluid additives via nozzle 200. One or more valves can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with an impeller as discussed previously) for washing of laundry items in wash basket 120.

After the agitation phase of the wash cycle is completed, wash basket 120 can be drained. Laundry articles can then be rinsed by again adding fluid to wash basket 120 depending on the specifics of the cleaning cycle selected by a user. The impeller may again provide agitation within wash basket 120. One or more spin cycles also may be used. In particular, a spin cycle may be applied after the wash cycle and/or after the rinse cycle to wring wash fluid from the articles being washed. During a spin cycle, wash basket 120 is rotated at relatively high speeds. After articles disposed in wash basket 120 are cleaned and/or washed, the user can remove the articles from wash basket 120, e.g., by reaching into wash basket 120 through opening 105.

FIG. 3 provides a front, perspective view of nozzle 200. FIG. 4 provides a rear, perspective view of nozzle 200. It should be understood that nozzle 200 may be used in any suitable washing machine appliance, in alternative exemplary embodiments. In addition, it should be understood that nozzle 200 depicted in FIGS. 3 and 4 is provided by way of example only, and that nozzle 200 may have other suitable arrangements or configurations, in alternative exemplary embodiments.

As may be seen in FIGS. 3 and 4, nozzle 200 includes an inlet body 210 and an outlet body 220. Outlet body 220 is integrally formed with inlet body 210. Thus, nozzle 200 is a unitary nozzle, e.g., such that inlet body 210 and outlet body 220 are constructed of a single continuous piece of material. For example, inlet body 210 and outlet body 220 may be constructed of a single continuous piece of plastic or metal, as discussed in greater detail below.

FIG. 5 provides a section view of nozzle 200 taken along the 5-5 line of FIG. 4. FIG. 6 provides a section view of nozzle 200 taken along the 6-6 line of FIG. 3. As may be seen in FIGS. 5 and 6, inlet body 210 defines an inlet conduit 212. Inlet conduit 212 is configured for receiving a flow of wash fluid and directing the flow of wash fluid through inlet body 210. As an example, a hose or other suitable flow conduit of washing machine appliance 100 may be coupled to inlet conduit 212 such that inlet conduit 212 receives the flow of wash fluid. Inlet conduit 212 may have any suitable shape. For example, inlet conduit 212 may have a circular and/or semi-circular cross-sectional shape, as may be seen in FIGS. 5 and 6. In particular, inlet body 210 may be define a bend or curve along a length of inlet body 210, e.g., where inlet conduit 212 shifts between a circular cross-sectional shape and a semi-circular cross-sectional shape along the length of inlet body 210. From inlet conduit 212 the flow of liquid passes to outlet body 220, as discussed in greater detail below.

Outlet body 220 defines an outlet conduit 222. Outlet conduit 222 is positioned downstream of inlet conduit 212 and is contiguous with inlet conduit 212. Thus, outlet conduit 222 may be positioned such that outlet conduit 222 receives the flow of wash fluid from inlet conduit 212. Outlet conduit 222 directs the flow of wash fluid through outlet body 220, e.g., into wash basket 120 of washing machine appliance 100 (FIG. 2) and articles within wash basket 120. As may be seen in FIGS. 5 and 6, outlet conduit 222 extends between an entrance 224 and an exit 226. Entrance 224 of outlet conduit 222 is positioned at inlet conduit 212 and receives the flow of wash fluid from inlet conduit 212. Exit 226 of outlet conduit 222 is positioned at or adjacent wash basket 120 and directs the flow of wash fluid from outlet conduit 222 into wash basket 120.

Outlet conduit 222 defines or has a first cross-sectional area at entrance 224 of outlet conduit 222. Outlet conduit 222 also defines or has a second cross-sectional area at exit 226 of outlet conduit 222. First cross-sectional area of outlet conduit 222 may be larger than second cross-sectional area of outlet conduit 222. Thus, outlet conduit 222 may expand from entrance 224 of outlet conduit 222 to exit 226 of outlet conduit 222.

As may be seen in FIGS. 5 and 6, a shape of the second cross-sectional area is different than or from a shape of the first cross-sectional area, e.g., in size and/or form. For example, the shape of the second cross-sectional area may be substantially arcuate as shown in FIGS. 3 and 4. Thus, the second cross-sectional area may be curved and extend arcuately between opposite sides of nozzle 200. Conversely, the shape of the first cross-sectional area may be circular or semicircular. Outlet conduit 222 may continuously and/or uniformly transition from the shape of the first cross-sectional area at entrance 224 of outlet conduit 222 to the second cross-sectional area to exit 226 of outlet conduit 222, e.g., such that each cross-section of outlet conduit 222 is substantially or about (e.g., with about three percent of) equal to an adjacent cross-section of outlet conduit 222 in size and/or form. As may be seen in FIGS. 5 and 6, entrance 224 of outlet conduit 222 may be centrally located at a back portion of outlet body 220, and exit 226 of outlet conduit 222 may extend arcuately such that portions or all of exit 226 of outlet conduit 222 is equidistant from entrance 224 of outlet conduit 222, e.g., along a radial direction. In addition to the arcuate shape shown in FIGS. 3 and 4, the second cross-sectional area may have additional arcuate or linear sections, e.g., such that the second cross-sectional area has a circular or oval shape, in alternative exemplary embodiments.

By shaping outlet conduit 222 in such a manner, e.g., by having the shape of the second cross-sectional area be substantially arcuate, a spray pattern from nozzle 200 onto articles within basket 120 may be improved. For example, wash fluid within nozzle 200 may exit nozzle 200 at the exit 226 of outlet conduit 222 in an arcuate spray. The arcuate spray may be complementary to a shape of basket 120, e.g., a sidewall of basket 120, such that the spray is uniformly and/or evenly applied to articles on the sidewall of basket 120 within basket 120. In addition, after a spin cycle, articles within basket 120 may be stuck on the sidewall of basket 120. The arcuate spray pattern of wash fluid from nozzle 200 may assist with rinsing articles within basket 120 when the articles within basket 120 are stuck on the sidewall of basket 120. Thus, the arcuate spray pattern of wash fluid from nozzle 200 may assist with "spray rinsing" articles within basket 120, e.g., as described in U.S. Pat. No. 5,737,790 of Badger et al., which is hereby incorporated by reference for all purposes, in order to conserve water. The arcuate spray pattern of wash fluid from nozzle 200 may also assist with disengaging or removing the articles from the sidewall of basket 120.

As may be seen in FIG. 4, outlet body 220 includes a top plate 228 and a bottom plate 230. Top plate 228 and bottom plate 230 are integral with each other and are spaced apart such that at least a portion of outlet conduit 222 is defined between top plate 228 and bottom plate 230 of outlet body 220. Top plate 228 and bottom plate 230 may have any suitable shape. For example, top plate 228 and bottom plate 230 may each have a spherical triangle shape. In particular, top plate 228 may be positioned above bottom plate 230 with bottom plate 230 nested within or adjacent top plate 228 when top and bottom plates 228, 230 have spherical triangle shapes.

FIG. 7 illustrates a method 700 for forming a unitary spray nozzle according to an exemplary embodiment of the present subject matter. Method 700 may be used to form any suitable nozzle. For example, method 700 may be used to form nozzle 200 (FIG. 3). Method 700 permits formation of various features of nozzle 200, as discussed in greater detail below. Method 700 includes fabricating nozzle 200 as a unitary nozzle, e.g., such that nozzle 200 is formed of a single continuous piece of plastic, metal or other suitable material. More particularly, method 700 includes manufacturing or forming nozzle 200 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 710, three-dimensional information of nozzle 200 is determined. As an example, a model or prototype of nozzle 200 may be scanned to determine the three-dimensional information of nozzle 200 at step 710. As another example, a model of nozzle 200 may be constructed using a suitable CAD program to determine the three-dimensional information of nozzle 200 at step 710. At step 720, the three-dimensional information is converted into a plurality of slices that each defines a cross-sectional layer of nozzle 200. As an example, the three-dimensional information from step 710 may be divided into equal sections or segments, e.g., along a central axis of nozzle 200 or any other suitable axis. Thus, the three-dimensional information from step 710 may be discretized at step 720, e.g., in order to provide planar cross-sectional layers of nozzle 200.

After step 720, nozzle 200 is fabricated using the additive process, or more specifically each layer is successively formed at step 730, e.g., by fusing or polymerizing a plastic using laser energy or heat. The layers may have any suitable size. For example, each layer may have a size between about five ten-thousandths of an inch and about one thousandths of an inch. Nozzle 200 may be fabricated using any suitable additive manufacturing machine as step 730. For example, any suitable laser sintering machine, inkjet printer or laserjet printer may be used at step 730.

Utilizing method 700, nozzle 200 may have fewer components and/or joints than known nozzles. Specifically, nozzle 200 may require fewer components because nozzle 200 may be a single piece of continuous plastic or metal, e.g., rather than multiple pieces of plastic or metal joined or connected together. Also, the shape and contour of outlet conduit 222 described above may be formed using method 700. As a result, nozzle 200 may provide improved flow from nozzle 200, e.g., by dispersing or spray wash fluid in a desired pattern. Also, nozzle 200 may be less prone to leaks and/or be stronger when formed with method 700.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A unitary spray nozzle for a washing machine appliance, comprising:
    an inlet body defining a bend along a length of the inlet body, the inlet body further defining an inlet conduit configured for receiving a flow of wash fluid and directing the flow of wash fluid through the inlet body; and
    an outlet body integrally formed within the inlet body and defining an outlet conduit, the outlet conduit being contiguous with the inlet conduit of the inlet body such that the outlet conduit is configured for receiving the flow of was fluid from the inlet conduit and directing the flow of wash fluid through the outlet body, the outlet conduit having a first cross-sectional area at an entrance of the outlet conduit and a second cross-sectional area at an exit of the outlet conduit, a shape of the second cross-sectional area being substantially arcuate, the shape of the second cross-sectional area being different than a shape of the first cross-sectional area.

2. The unitary spray nozzle of claim 1, wherein the outlet body comprises a top plate and a bottom plate, the top plate and the bottom plate spaced apart from each other such that at least a portion of the outlet conduit is defined between the top plate and the bottom plate of the outlet body.

3. The unitary spray nozzle of claim 1, wherein the top and bottom plates each have a partially spherical shape.

4. The unitary spray nozzle of claim 1, wherein the inlet body and the outlet body are constructed of a single continuous piece of material.

5. The unitary spray nozzle of claim 4, wherein the inlet body and the outlet body are constructed of a single continuous piece of plastic or metal.

6. The unitary spray nozzle of claim 1, wherein the shape of first cross-sectional area is substantially hemispherical.

7. The unitary spray nozzle of claim 1, wherein the inlet body is positioned above the outlet body at the entrance of the outlet body.

8. The unitary spray nozzle of claim 7, wherein the entrance of outlet conduit is positioned above the exit of the outlet conduit.

9. The unitary spray nozzle of claim 1, wherein the outlet conduit expands radially from the entrance of outlet to the exit of the outlet conduit.

10. The unitary spray nozzle of claim 1, wherein the inlet conduit shifts between a circular cross-sectional shape and a semi-circular cross-sectional shape along the length of the inlet body.

11. A method for forming a unitary spray nozzle for a washing machine appliance, comprising: establishing three-dimensional information of the unitary spray nozzle; converting the three-dimensional information of the unitary spray nozzle from said step of establishing into a plurality of slices, each slice of the plurality of slices defining a respective cross-sectional layer of the unitary spray nozzle; and successively forming each cross-sectional layer of the unitary spray nozzle with an additive process; wherein, after said step of successively forming: (1) the unitary spray nozzle has an inlet body defining a bend along a length of the inlet body and also defines an inlet conduit and an outlet body defining an outlet conduit; (2) the outlet conduit is contiguous with the inlet conduit; (3) the outlet conduit having a first cross-sectional area at an entrance of outlet conduit and a second cross-sectional area at an exit of the outlet conduit, a shape of the second cross-sectional area being substantially arcuate; and (4) a shape of the second cross-sectional area is different than a shape of first cross-sectional area.

12. The method of claim 11, wherein the additive process comprises at least one of fused deposition modeling, selective laser sintering, stereolithography, and digital light processing.

13. The method of claim 11, wherein the shape of the second cross-sectional area is substantially arcuate after said step of successively forming.

14. The method of claim 11, wherein the outlet body comprises a top plate and a bottom plate after said step of successively forming, the top plate and the bottom plate spaced apart from each other such that at least a portion of the outlet conduit is defined between the to plate and the bottom plate of the outlet body.

15. The method of claim 14, wherein the top and bottom plates each have a partially spherical shape after said step of successively forming.

16. The method of claim 11, wherein the shape of first cross-sectional area is substantially hemispherical after said step of successively forming.

17. The method of claim 11, wherein the inlet body is positioned above the outlet body at the entrance of the outlet body after said step of successively forming.

18. The method of claim 17, wherein the entrance of outlet conduit is positioned above the exit of the outlet conduit after said step of successively forming.

19. The method of claim 11, wherein the outlet conduit expands radially from the entrance of outlet to the exit of the outlet conduit after said step of successively forming.

20. The method of claim 11, wherein the unitary spray nozzle comprises a single continuous piece of plastic after said step of successively forming.

\* \* \* \* \*